United States Patent
Koester et al.

(10) Patent No.: US 7,484,710 B2
(45) Date of Patent: Feb. 3, 2009

(54) FLUID FLOW CONTROL VALVE WITH HIGH TEMPERATURE BI-DIRECTIONAL SHUTOFF

(75) Inventors: David John Koester, Gladbrook, IA (US); Sarah Lynn Dvorak, Ames, IA (US); Lynn Dean Mahncke, Marshalltown, IA (US); Brandon Wayne Bell, Marshalltown, IA (US); Ronald R. Brestel, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 40 days.

(21) Appl. No.: 11/068,946

(22) Filed: Feb. 28, 2005

(65) Prior Publication Data

US 2005/0211942 A1 Sep. 29, 2005

Related U.S. Application Data

(63) Continuation-in-part of application No. 10/101,139, filed on Mar. 19, 2002, now Pat. No. 6,974,121.

(51) Int. Cl.
*F16K 5/08* (2006.01)
(52) U.S. Cl. ............ 251/160; 251/172; 251/192; 251/298; 251/315.07
(58) Field of Classification Search ............ 251/174, 251/175, 177, 192, 298, 315.07, 170–172, 251/160–163
See application file for complete search history.

(56) References Cited

U.S. PATENT DOCUMENTS

| | | | |
|---|---|---|---|
| 2,883,146 A | | 4/1959 | Knox |
| 2,883,147 A | * | 4/1959 | Mirza et al. ............ 251/172 |
| 3,191,906 A | | 6/1965 | Zeigler et al. |
| 3,218,024 A | * | 11/1965 | Kroekel ............ 251/172 |
| 3,219,055 A | | 11/1965 | Dumm |
| 3,241,808 A | | 3/1966 | Allen |
| 3,472,270 A | * | 10/1969 | Masheder ............ 251/315.08 |
| 3,675,894 A | * | 7/1972 | Friedell ............ 251/163 |

(Continued)

FOREIGN PATENT DOCUMENTS

DE 26 23 822 A1 8/1977

(Continued)

OTHER PUBLICATIONS

International Search Report received in International (PCT) Application PCT/US2006/000820, by the European Patent Office, dated May 22, 2006.

(Continued)

*Primary Examiner*—John Bastianelli
(74) *Attorney, Agent, or Firm*—Marshall, Gerstein & Borun LLP (57) ABSTRACT

A control valve of the ball type with bi-directional shutoff capabilities is disclosed. The ball valve including an inlet and an outlet, a ball element and a seal assembly. When closing the valve, the ball element, which is eccentrically mounted on a shaft, rotates to abut the seal assembly. While closed, the seal assembly including a seal housing, a main seal and a resilient member, contacts the ball element at the main seal, while the resilient member biases the main seal toward the ball element. The seal assembly further includes a secondary flowpath between the main seal and seal housing, which is restricted by a high temperature seal.

19 Claims, 6 Drawing Sheets

U.S. PATENT DOCUMENTS

| | | | | | |
|---|---|---|---|---|---|
| 3,830,693 | A | * | 8/1974 | Beser et al. | 251/174 |
| 3,946,986 | A | * | 3/1976 | Sutter et al. | 251/298 |
| 3,960,363 | A | | 6/1976 | Domyan | |
| 4,013,264 | A | * | 3/1977 | Friedell | 251/192 |
| 4,029,292 | A | | 6/1977 | Kramer et al. | |
| 4,073,473 | A | * | 2/1978 | Rihm et al. | 251/192 |
| 4,124,036 | A | * | 11/1978 | Rogers | 251/160 |
| 4,217,923 | A | * | 8/1980 | Kindersley | 251/174 |
| 4,332,267 | A | * | 6/1982 | Evans | 251/159 |
| 4,508,173 | A | * | 4/1985 | Read | 251/160 |
| 4,519,579 | A | | 5/1985 | Brestel et al. | |
| 4,566,482 | A | | 1/1986 | Stunkard | |
| 4,575,045 | A | * | 3/1986 | Martin et al. | 251/174 |
| 4,641,682 | A | | 2/1987 | Harris | |
| 4,676,480 | A | * | 6/1987 | Garceau et al. | 251/174 |
| 4,747,578 | A | * | 5/1988 | Kivipelto et al. | 251/175 |
| 4,815,701 | A | | 3/1989 | Stone | |
| 4,822,000 | A | | 4/1989 | Bramblet | |
| 4,883,253 | A | * | 11/1989 | Hashimoto et al. | 251/163 |
| 5,016,857 | A | | 5/1991 | Bovee | |
| 5,076,737 | A | | 12/1991 | Loutsch et al. | |
| 5,101,853 | A | * | 4/1992 | Mailliet et al. | 251/159 |
| 5,333,833 | A | * | 8/1994 | Reinicke | 251/160 |
| 5,611,516 | A | * | 3/1997 | Reinicke et al. | 251/174 |
| 5,618,026 | A | | 4/1997 | Geyer | |
| 6,279,875 | B1 | | 8/2001 | Chatufale | |
| 6,530,273 | B1 | * | 3/2003 | Gottlieb et al. | 251/129.06 |
| 2003/0178595 | A1 | | 9/2003 | Koester et al. | |

FOREIGN PATENT DOCUMENTS

| | | | |
|---|---|---|---|
| DE | 2945153 | A1 | 11/1979 |
| EP | 0483611 | A1 | 5/1992 |

OTHER PUBLICATIONS

Written Opinion for Application PCT/US2006/000820 by the European Patent Office, dated May 22, 2006.

International Search Report for International Patent Application No. PCT/US03/04670, dated Jun. 25, 2003, 8 pages.

Written Opinion for International Patent Application No. PCT/US03/04670, dated Oct. 22, 2003, 8 pages.

Fisher Controls International, "Design V100 Vee-Ball Control Valves," Instruction Manual, Form 5061, Feb. 1993, 3 pages.

Fisher Controls International, "Design SS256 (V300 with Bi-directional Fisher TCM Plus for Fisher TCM Ultra Seal," PS Sheet 59.8:040, Aug. 1999/LLB, 1 page.

Fisher Controls International, "Vee-Ball Design V150, V200, and V300 Rotary Control Valves Sizes 1-through 12-Inch," Instruction Manual, Form 5290, Nov. 2003, 44 pages.

Fisher Controls International, "Type 8560 Eccentric Disk Butterfly Control Valve," Instruction Manual, Form 5343, Jun. 2001, 32 pages.

Fisher Product Bulletin May 2002, Design V500 eplug Rotary Control Valve.

Fisher Controls International Product Bulletin Jan. 2002, Type 8510 and 8510B Eccentric Disk Control Valves (EMA[(1)]).

Fisher Controls International Product Bulletin Jul. 2001; Design CV500 eplug Rotary Control Valve.

Fisher Controls International Product Bulletin Jan. 2000; Vee-Ball Designs V150, V200 and V300 Rotary Control Valves.

Fisher Controls International Product Bulletin; Baumann 42000 Rotary Eccentric-Plug Control Valve, Jun. 21, 2002.

Masoneilan Cam Flex II 35002 Series, copyright 1997.

Valtek Bulletin Shearstream Control Valve, copyright 1999.

Valtek Bulletin Shearstream Segmented Ball Control Valve. (This valve was generally available to the public one year prior to the filing of the current application. the information provided herein, however, was obtained from the manufacturers website after the filing of the application).

Valtek Bulletin Control Products and Services, copyright 1998.

* cited by examiner

FLUID FLOW CONTROL VALVE WITH HIGH TEMPERATURE BI-DIRECTIONAL SHUTOFF

CROSS REFERENCES TO RELATED APPLICATIONS

The present application is a Continuation In Part (CIP) of application Ser. No. 10/101,139, filed on Mar. 19, 2002, entitled "Fluid Flow Control Valve with Bi-Directional Shutoff," and is hereby incorporated by reference herein in its entirety for all purposes.

FIELD OF THE DISCLOSURE

The disclosure relates to fluid valves and, more particularly, relates to fluid valves of the ball-type having a high temperature seal.

BACKGROUND OF THE DISCLOSURE

Ball valves are used in a wide number of process control system applications to control some parameter of a process fluid (this may be a liquid, gas, slurry, etc.). While the process control system may use a control valve to ultimately control the pressure, level, pH or other desired parameter of a fluid, the control valve basically controls the rate of fluid flow.

Typically, a ball valve may include a fluid inlet and a fluid outlet separated by a ball element which, by rotating about a fixed axis and abutting to a seal assembly, controls the amount of fluid flow therethrough. During operation, the process control system, or an operator controlling the control valve manually, rotates the ball element against a surface of the seal assembly, thereby exposing a flow passage, to provide a desired fluid flow through the inlet and outlet and, therefore, the ball valve.

Ball valve components, including the ball element and assembly, are typically constructed of metal; this stands especially true when used in high pressure and/or high temperature applications. During operation of the valve, many components suffer wear due to repeated and extensive cycling of the valve, specifically the ball element and seal assembly, due to continuous frictional contact during the opening and closing of the valve. The problems resulting from the wear include, but are not limited to, diminished life span of the valve components, increased frictional forces between the ball element and the seal assembly, and undesirable leakage between the ball element and the seal assembly. Similarly, as the frictional forces relatively increase with the amount of wear the components experience, the dynamic performance and control characteristics within the valve are worsened, resulting in inefficiencies and inaccuracies in the valve.

In the past, attempts have been made to incorporate a biased main seal into the seal assembly to correct the above mentioned problems. This, however, has resulted in limiting the applications of the valve, including constraining the valve to limited bi-directional sealing capabilities. Furthermore, with the additional force and pressure created by the biased main seal against the ball element, additional wear between the ball element and the seal assembly, and specifically the main seal, is created. Additional attempts have also been made to correct the above problems, by mounting the ball element on a cam, such that the ball element during the initial stages of opening and closing the valve, withdraws from engagement with the main seal with rotation. This, however, has resulted in further complications, such as trapping debris between the ball element and the main seal. For example, when the media traveling through the valve contains fibrous material such as pulp stock or particles, the fibrous material may be trapped between the ball element and the main seal during the closing of the valve, effectively creating a leak path through the valve.

Therefore, there remains a need for an improved ball valve having a seal assembly and a ball element, that is capable of bi-directional sealing of the fluid, that is able to reduce the wear between the main seal and the ball element, that retains positive dynamic performance and control characteristics, and that prevents fibrous material or particles from being trapped between the ball element and the main seal.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Figure 1:
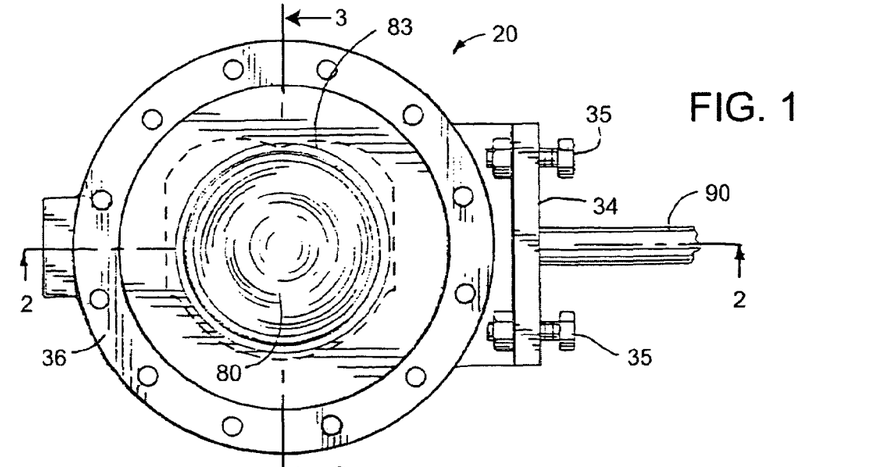
FIG. 1 is a top view of a ball valve constructed in accordance with the teachings of the disclosure.
Figures 2, 3:
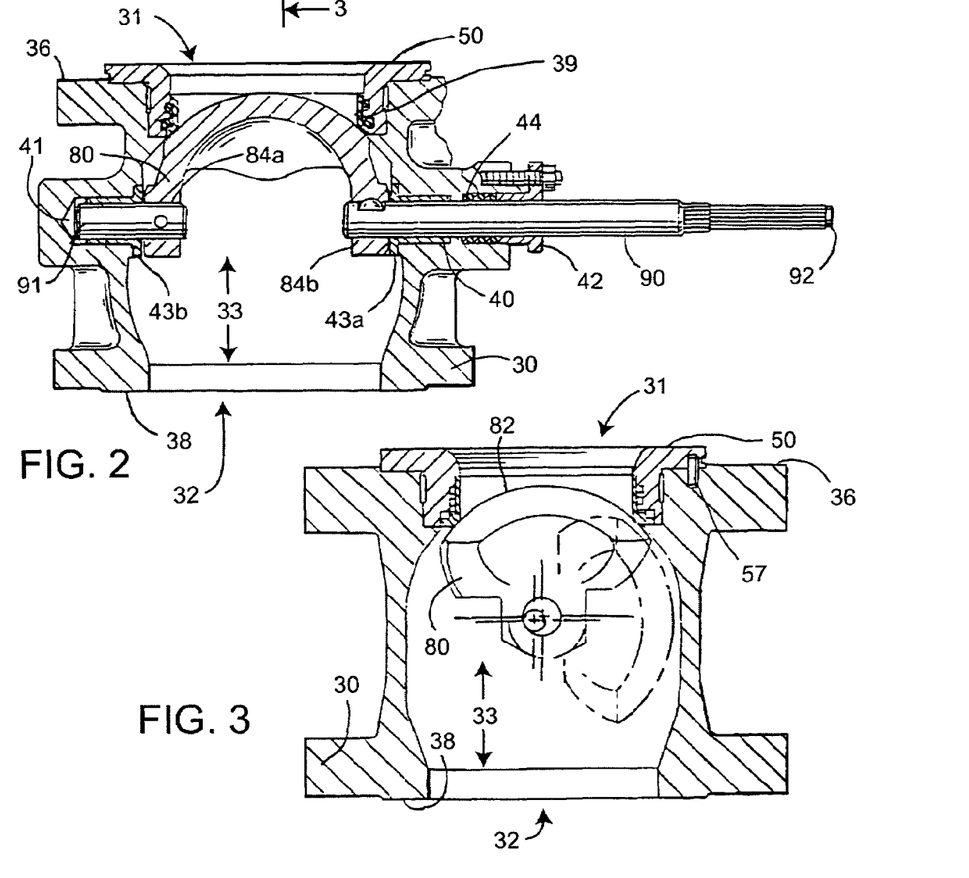
FIG. 2 is a cross-sectional view of the ball valve of FIG. 1, taken along line 2-2 of FIG. 1.
FIG. 3 is a cross-sectional view of the ball valve of FIG. 1, taken along line 3-3 of FIG. 1, and with the location of the ball element when the valve is in the open position being shown in phantom.

Referring now to the drawings, and with specific reference to FIGS. 1-3, a ball valve constructed in accordance with the teachings of the disclosure is generally depicted by reference numeral 20. As shown therein, the ball valve 20 includes a housing 30 having a primary flowpath 33 between an inlet 31 and an outlet 32, a seal assembly 50 and a ball element 80 mounted on rotatable shafts 90 and 91.

The housing 30, generally having a cylindrical shape, defines the primary flowpath 33 for a fluid traveling therethrough. At the bottom of the housing 30, as oriented in FIG. 2, is the outlet 32, of the primary flowpath 33, the outlet 32 being surrounded by an outlet flange 38. In the middle portion of the housing 30, a thru hole 40 penetrates the right wall of the housing 30, and a blind hole 41 opens to the interior of the housing 30, both holes 40 and 41 being concentric to each other and adapted to receive the shaft 90 and 91, respectively. Disposed between the drive shaft 90 and the outer right wall or "drive end" of the housing 30, is a packing follower 42, a set of packing rings 44, and a bearing 43a. Disposed between the follower shaft 91 and the inner left wall or "follower end" of the housing 30, is a bearing 43b. Located on the drive end of housing 30, and adapted to engage with fasteners 35, is a shaft flange 34. Now turning to the top of the housing 30, still as oriented in FIG. 2, is a counterbore 39, creating the inlet 31 of the primary flowpath 33 and, being adapted to receive the seal assembly 50. Surrounding the inlet 31 is an inlet flange 36, the inlet flange 36 being adapted to fasten to an incoming pipe (not shown). It should be noted at this point, that the inlet flange 36 and the outlet flange 38 may be wholly or partially removed, and that the connections between the inlet 31 and the outlet 32 may be made in various ways.

Figure 4:
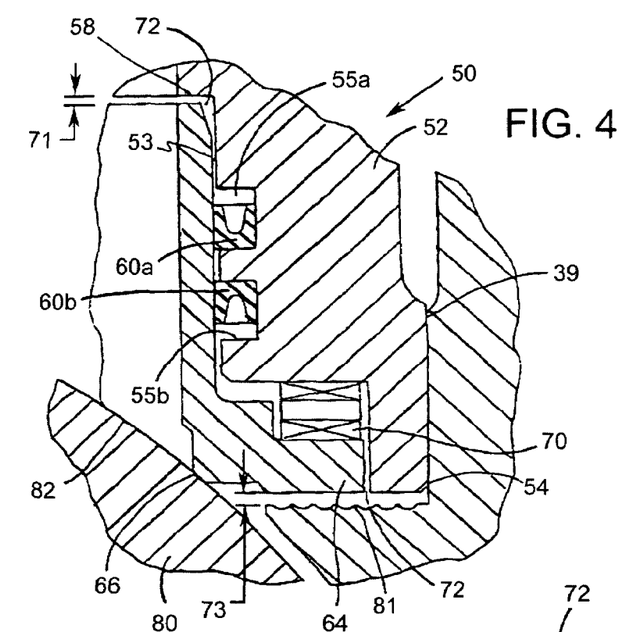
FIG. 4 is an enlarged, fragmentary sectional view of a portion of FIG. 3, depicting the ball valve in the closed position, including a main seal, a set of two seal rings, a spring member and a seal housing.
Figure 4A:
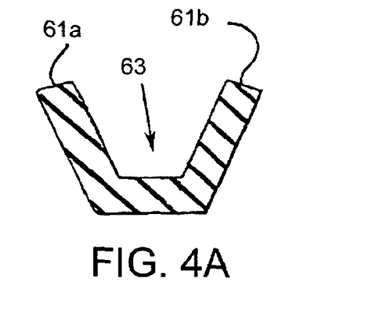
FIG. 4A is detailed sectional view of FIG. 4, depicting a sealing ring.
Figure 5:
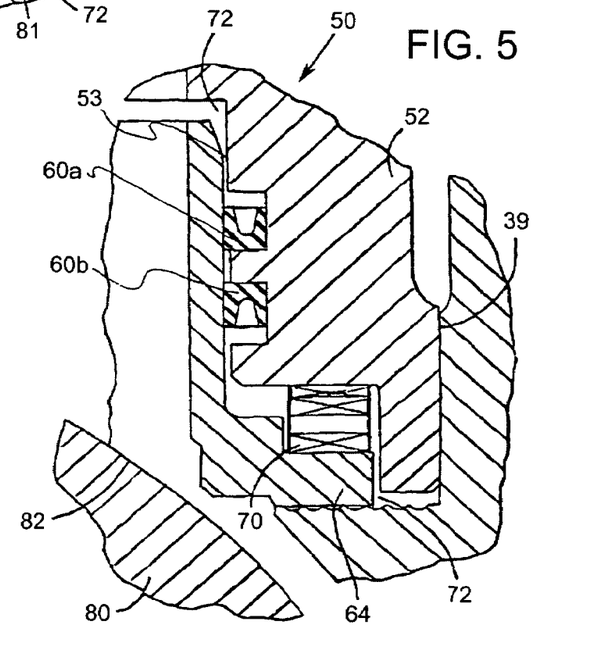
FIG. 5 is a view similar to FIG. 4, but depicting the ball valve opening, including the main seal, the two seal rings, the spring member and the seal housing.
Figure 5A:
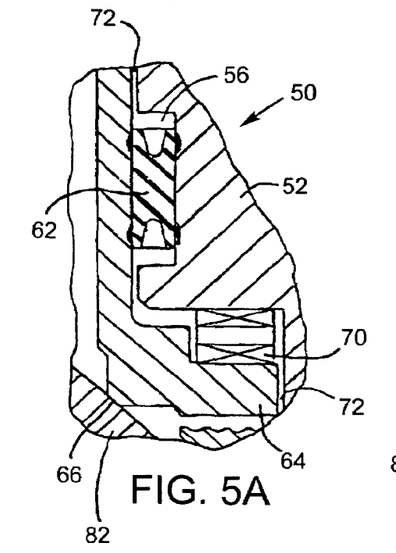
FIG. 5A is a fragmented sectional view, depicting the ball valve in the closed position, including a main seal, a single seal ring, a spring member and a seal housing.
Figure 9:
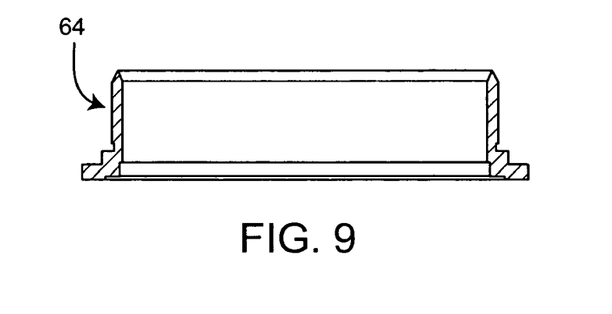
FIG. 9 is a cross-sectional view of the main seal.
Figure 10:
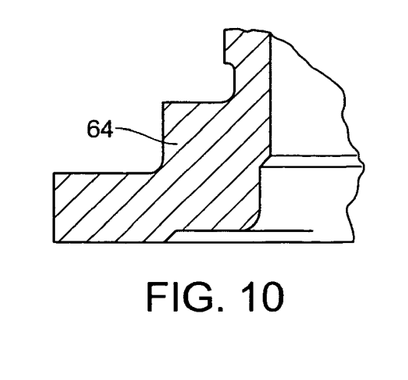
FIG. 10 is an enlarged, fragmentary sectional view of the main seal of FIG. 9.
Figure 11:
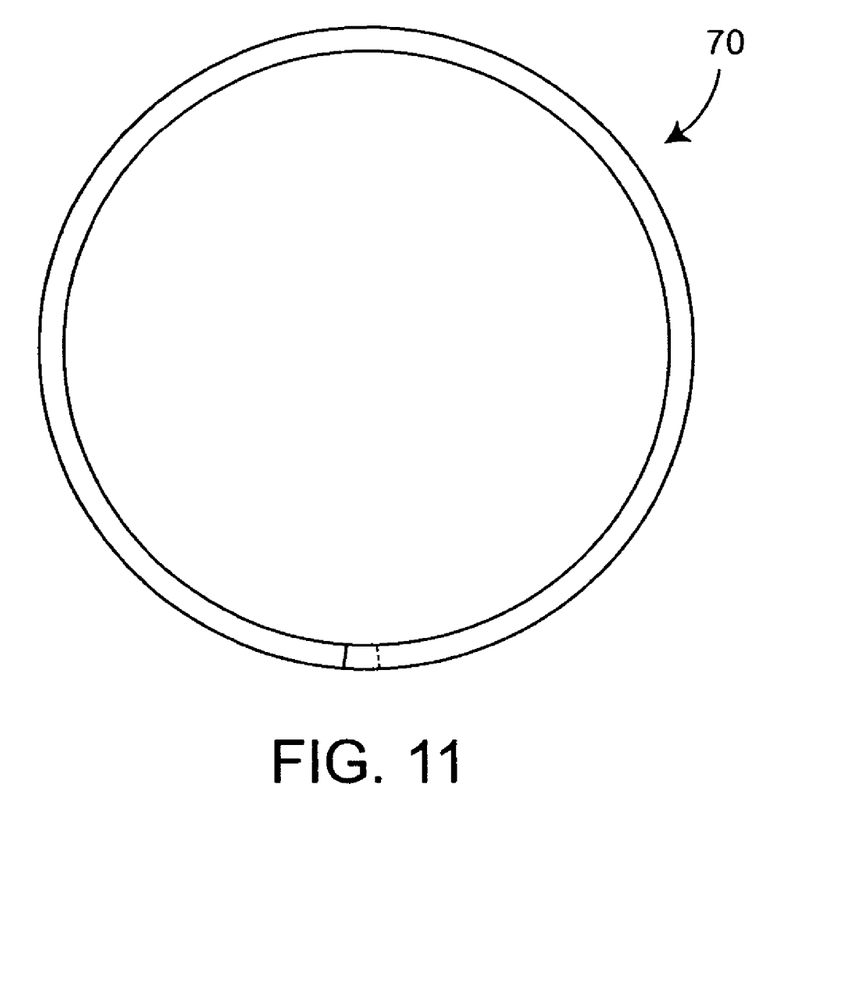
FIG. 11 is a top view of a wave spring.
Figure 12:
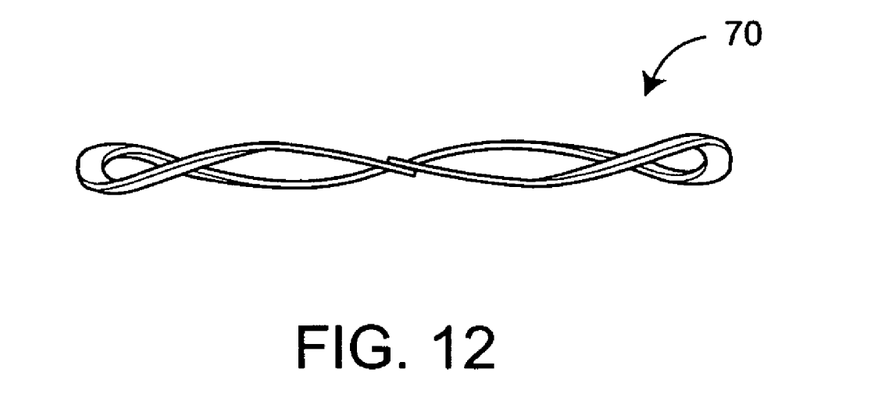
FIG. 12 is a side view of the wave spring of FIG. 11.

The seal assembly 50, as shown best in FIGS. 4-5A, includes a first sealing body, preferably a main seal 64, and a second sealing body, preferably a seal housing 52. As mentioned above, the seal assembly 50 is disposed within the counterbore 39 of the housing 30, and more specifically, an exterior surface 54 of the seal housing 52 is fixedly attached within the counterbore 39. On an interior surface 53 of the seal housing 52 (FIGS. 7 and 8), is a pair of annular grooves 55a & 55b, adapted to receive a first seal ring 60a and a second seal ring 60b, respectively. As can best be seen in FIG. 4 and 5, the seal assembly 50 further includes a resilient member 70, such as a wave spring, and the main seal 64. The pair of seal rings 60a & 60b and the resilient member 70 operatively connect the main seal 64 to the seal housing 52. The resilient member 70 is disposed between the main seal 64 (FIGS. 9 and 10) and the seal housing 52, creating a bias on the main seal 64 toward the ball element 80, by the addition of which an inadvertent secondary flowpath 72 between the main seal 64 and the seal housing 52 is created. The pair of seal rings 60a & 60b may also be disposed between the main seal 64 and seal housing 52, creating a flow restriction of the fluid through the secondary flowpath 72.

Abutting the main seal 64, when the valve 20 is in the closed position, is the ball element 80 (FIG. 4). The ball element 80 includes a spherical surface 82 and preferably a V-notch portion 83 (FIG. 1), enabling the valve 20 to gradually be opened and closed. Attached to the ball element 80, through thru holes 84a & 84b are the follower shaft 91 and the drive shaft 90, respectively.

As mentioned previously, aiding the shafts 90 and 91 in alignment and rotation, are bearings 43a & 43b, disposed between the housing 30 and the shafts 90 and 91, respectively. Once again, as oriented in FIG. 2, the follower shaft 91 is disposed in the blind hole 41 of the follower end of housing 30. Engaging the follower shaft 91 and disposed between the follower end of housing 30 and the ball element 80 is the bearing 43b, and disposed between the drive end of the housing 30 and the ball element 80 is the bearing 43a. The drive shaft 90 then penetrates through the drive end of housing 30 via the thru hole 40, and engages the packing rings 44 and the packing follower 42 before protruding outside of the housing 30. At a outside end 92 of the shaft 90, the shaft 90 may be adapted to engage with an opening and closing mechanism.

In one example, as can best be seen in FIG. 3, the ball element 80 is mounted to the shaft 90 such that the ball element 80 rotates eccentrically. For example, the ball element 80 has a natural pivot point, which is the point at which the ball element 80 rotates so that all points on the spherical surface 82 of the ball element 80 are equidistant from the natural pivot point. When the ball element is rotated eccentrically, however, the points on the spherical surface 82 of the ball element 80 are not equidistant from the natural pivot point and, therefore, is eccentric.

It should be noted at this point, as those skilled in the art know, that the eccentricity of the ball element 80 can be created in several ways, including, but not limited to, offsetting the center of the shafts 90 and 91 relative to the natural pivot point of the ball element 80. Similarly, the eccentric movement of the ball element 80, may be accomplished with a combination of eccentrically mounted components, which may provide for additional benefits. For example, the eccentric movement created by offsetting the center of the shafts 90 and 91 relative to the natural pivot point of the ball element. 80, in combination with offsetting the shaft 90 and 91 relative to the valve housing 30, may eliminate the need to alter the seal assembly 50, such as creating a non-concentric thru hole in the seal housing 52, to compensate for the offset placement of the ball element 80 created by a single eccentric motion within the valve 20.

In FIG. 4, the ball element 80 is eccentrically rotated to abut the main seal 64, thereby creating a flow restriction of the primary flowpath 33 at a contact point 66. Preferably, as shown in FIGS. 4 and 5, when the ball element 80 presses against the main seal 64, the main seal 64 may be displaced into the seal housing 52 by compressing the resilient member 70. To ensure proper movement and operation of the main seal 64, relative to the ball element 80 and the seal housing 52, a predetermined or calculated gap 71 created between the main seal 64 and the seal housing 52 may be carefully set. The gap 71 may be carefully set to ensure that the main seal 64 contacts the ball element 80, when the valve 20 is in the closed position. Working in combination with the gap 71 to ensure proper movement and operation of the valve 20, is a gap 73 created between the main seal 64 and the housing 30. The gap 73 ensures that the main seal 64 comes into direct contact with the housing 30, at the proper time, when the valve 20 is opening and closing. For example, if the gap 73 were too large, the main seal 64 may stay in contact with the ball element for an extended period of time during opening and closing of the valve 20, thereby resulting in an unwanted and avoidable amount of friction and wear between the main seal 64 and ball element 80. Similarly, if the gap 73 were too small, the main seal 64 may contact the housing during the opening and closing of the valve 20 too soon, effectively preventing the main seal 64 from contacting the ball element 80, thereby creating a leak in the valve 20.

To set the gap 71, the shafts 90 and 91 and hence the ball element 80, may be rotated using an actuator or actuator linkage (not shown). For example, as the eccentrically mounted ball element 80 rotates toward the closed position, the ball element 80 may contact the main seal 64, thereby causing the gap 71 to become smaller, the further the ball element 80 rotates into the fully closed position. As the ball element 80 is rotated, and as the gap 71 becomes smaller, the gap 71 may be measured and may then be set by providing a stop at the actuator or actuator linkage.

In another example, the gap 71 may be utilized to ensure proper dimension between the components of the valve 20 and to verify the size of the gap 73. More specifically, every component, and features within those components of the valve 20, have dimensions and tolerances to ensure a proper fit between the components of the valve 20. Nonetheless, even though all of the dimension and tolerances may be adhered to during the manufacturing processes of the different components, the add up or stack up of tolerances, may create a misalignment or situation, whereby proper operation of the valve 20 may be prevented. Therefore, by measuring and setting the gap 71 to an acceptable range and position, which may be as simple as placing a set of metal gages in the gap 71, one being on the high end of an acceptable range, and the other being on the low end of the acceptable range, the valve 20 may be easily assembled, all the while ensuring proper alignment and movement between the components of the valve 20. Moreover, the calculated gap 71 and hence the gap 73, can be repeatedly measured, aligned, and set. This is due to the accessibility of the gap 71 from an outside or exterior surface of the valve 20. The valve 20, therefore, need not be disassembled in order to properly calibrate the gap 71.

Also shown in FIGS. 4 and 5 is the secondary flowpath 72, inadvertently created between the main seal 64 and the seal housing 52 for accommodation of the resilient member 70. To prevent seepage through the secondary flowpath 72, preferably two unidirectional seal rings 60a & 60b are disposed between the main seal 64 and the seal housing 52, and more specifically are disposed within the annular grooves 55a & 55b on the inner surface 53 of the seal housing 52, respectively. The seal rings 60a & 60b, (FIG. 4A) preferably each have a first leg 61a and a second leg 61b, the legs defining a fluid receiving area 63 therebetween and adapted to receive fluid and thereby biasing the legs 61a & 61b apart to seal the secondary flowpath 72. The seal rings 61a & 61b may be manufactured from a rubber, plastic or metal material, or from any other material able to function properly. The seal rings 60a & 60b may also be positioned in series to prevent the flow of fluid through the secondary flowpath 72 when the valve 20 is pressurized from either the inlet or the outlet. It should be realized, however, that two uni-directional seal rings placed in series, is one of many ways to restrict the flow of fluid through the secondary flowpath 72 bi-directionally. Among other solutions, for example, the seal rings could be placed in parallel, or the pair of seal rings could be replaced by a single bi-directional seal ring 62 as shown in FIG. 5A, preferably disposed in a single annular groove 56. Furthermore, because the seal rings 60a & 60b are disposed between the seal housing 52 and the main seal 64, the main seal 64 is enabled to properly align with the ball element 80.

Figure 6:
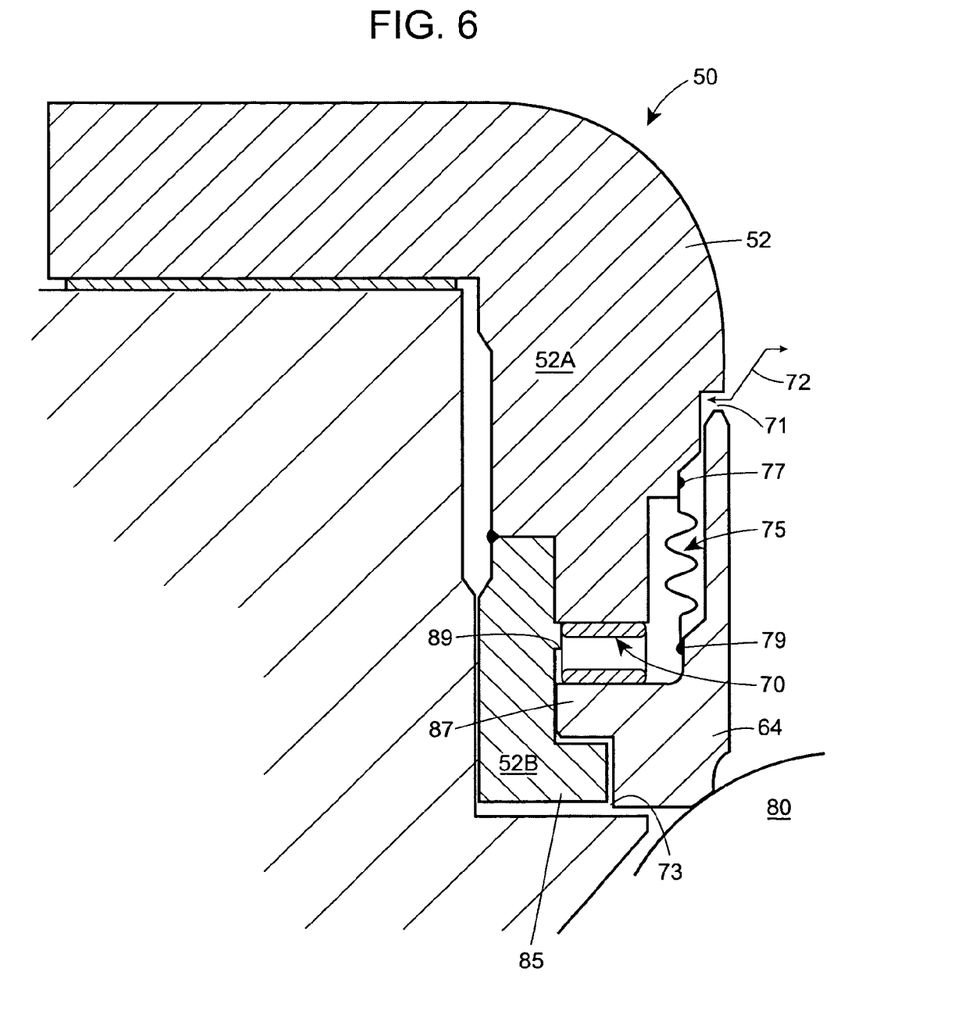
FIG. 6 is an enlarged, fragmentary sectional view of a alternate embodiment of a seal assembly, depicting the ball valve in the closed position, including a main seal, a high temperature capable seal ring, a spring member and a seal housing.
Figure 6A:
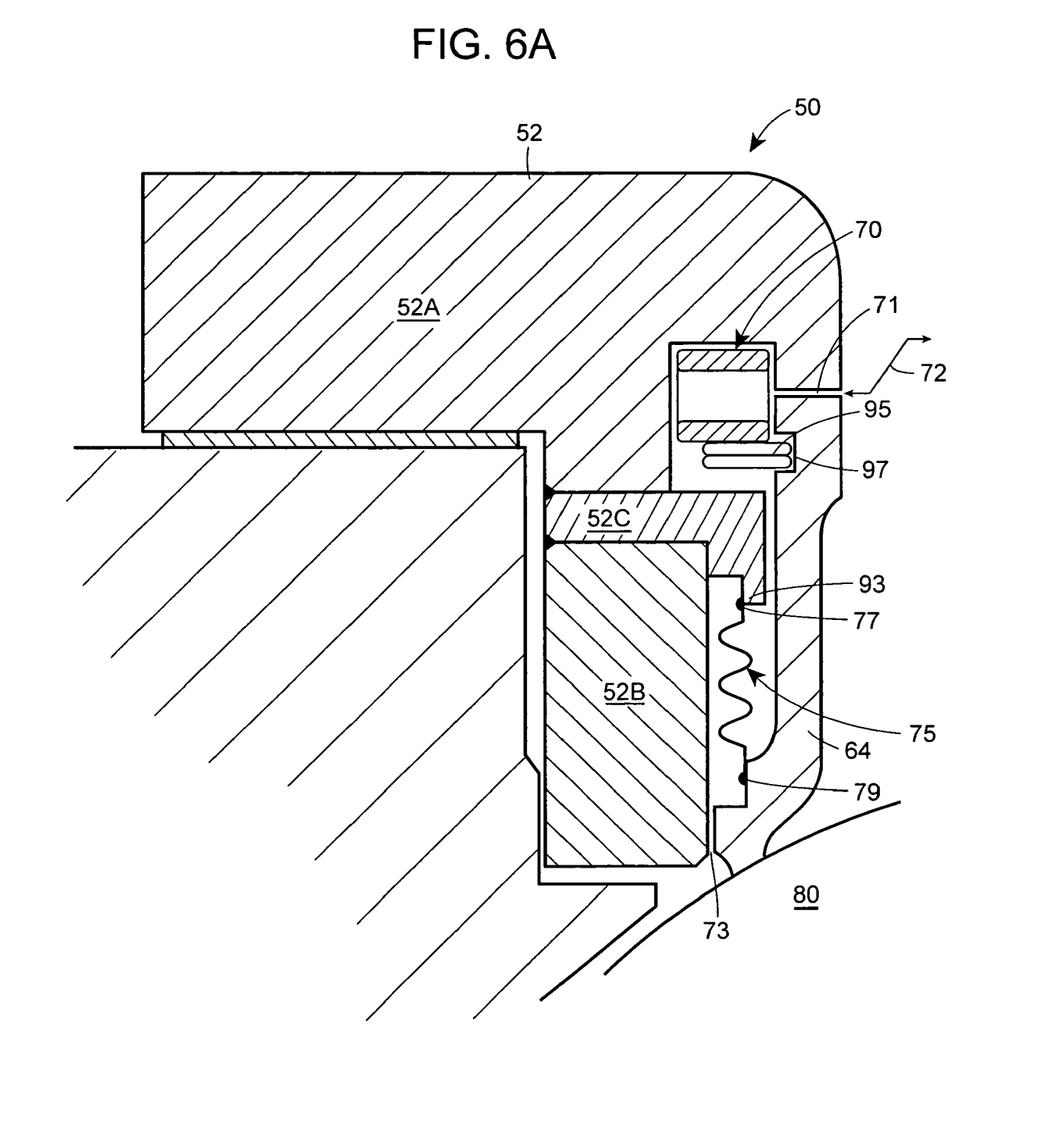
FIG. 6A is an enlarged, fragmentary sectional view of a another alternate embodiment of a seal assembly, depicting the ball valve in the closed position, including a main seal, a high temperature capable seal ring, a spring member and a seal housing.

In an alternate embodiment of the seal assembly 50, as seen in FIGS. 6 and 6A, the secondary flowpath 72 may be restricted by the use of a bellows 75. The bellows 75 includes a plurality of undulations, folds, ripples, or deformations that allows substantially unrestricted movement of upper and lower ends 77, 79 of the bellows 75, as oriented in FIGS. 6 and 6A, relative to each other. The bellows 75 may be constructed from an anti-corrosive metal alloy. Suitable alloys include nickel/chrome alloys such as INCONEL, a trademark registered to Inco Alloys International, Inc.) and HASTELLOY, a trademark registered to Haynes International, Inc., among others.

As illustrated in FIGS. 6 and 6A, the seal housing 52, in these embodiments, may be constructed from more than one piece. For example, as illustrated in FIG. 6, he seal housing 52 may include an upper seal housing portion 52a and a lower seal housing portion 52b, that may be connected or attached via a weld, for example. A ledge or ridge 85 is disposed near a lower end of the seal housing 52, and extends inwardly toward the flowpath 33 of the valve 20. The ridge 85 engages a ledge 87 that extends outwardly toward the seal housing 52 from the main seal 64, when the valve 20 is in an open position, and provides a stop for the main seal 64 biased against the seal housing 52 by the resilient member 70. Additionally, the lower seal housing portion 52b may include a second ridge 89 that extends inwardly therefrom to provide a stop for the main seal 64, when the valve 20 is in a closed position.

The upper end 77 of the bellows 75 is attached or connected to the seal housing 52, and the lower end 79 of the bellows 75 is attached or connected to the main seal 64, thereby restricting the second flowpath 72. Due to the inherent properties of the material and the nature of the design, the bellows 75 accommodates the movement of the main seal 64 relative to the seal housing 52 without leakage through the second flowpath 72, and can compensate for the fluid pressures experienced from either side of the bellows 75. For example, if the fluid pressure is received through the gap 71, then the bellows 75 may be forced toward the seal housing 52 until portions of bellows abut the seal housing 52, essentially bottoming-out the bellows 75 against seal housing 52. Similarly, if the fluid pressure is received through the gap 73, then the bellows 75 may be forced toward the main seal 64 until portions of bellows abut the main seal 64, essentially bottoming-out the bellows 75 against main seal 64.

In constructing the seal assembly 50, as described above, the bellows 75, the upper seal housing portion 52a, and a lower seal housing portion 52b may be attached or connected to their respective mating objects via a weld. The connections may occur in specific steps to ensure proper attachment or a good quality connection. For example, the upper end 77 of the bellows 75 may first be attached to the seal housing 52a, such that there is easy access to the upper end 77 of the bellows 75. Next, the lower end 64 of the bellows 75 may be attached to the seal housing 64, wherein the weld is provided through an area later occupied by the resilient member 70. The resilient member 70 may now be inserted, and the upper and lower seal housing portion 52a and 52b may be connected.

In another example, as illustrated in FIG. 6A, the resilient member 70 is located on the opposite side of the bellows 75, relative to the flowpath 72, thereby allowing the main seal 64 to take on a more tubular appearance and reducing the leakage between the ball element 80 and the main seal 64. In this example, the seal housing 52 may include the upper seal housing portion 52a, a middle seal housing portion 52c, and the lower seal housing portion 52b, that may be connected or attached via a weld, for example. A downwardly extending rim 93 may be disposed near a lower end of the middle seal housing portion 52c, that extends toward the bellows 75. The rim 93 provides for an attachment point for the upper end 77 of the bellows 75. A retaining ring 95 is disposed adjacent the resilient member 70, to provide a biasing force of the resilient member 70 against the main seal 64.

More specifically, the retaining ring 95 may be disposed in a groove 97 located in an upper portion of the main seal 64, thereby fixing the retaining ring 95 relative to the main seal 64. The resilient member 70 is disposed between the retaining ring 95 and the upper seal housing portion 52a, thereby providing a downward bias against the main seal 64.

In constructing the seal assembly 50, as described above, the connections may occur in specific steps to ensure proper attachment or a good quality connection. For example, the upper and lower ends 77 and 79 of the bellows 75 may be attached or connected before the upper, middle, and lower seal housing portions 52a, 52c, 52b.

Figures 7, 8:
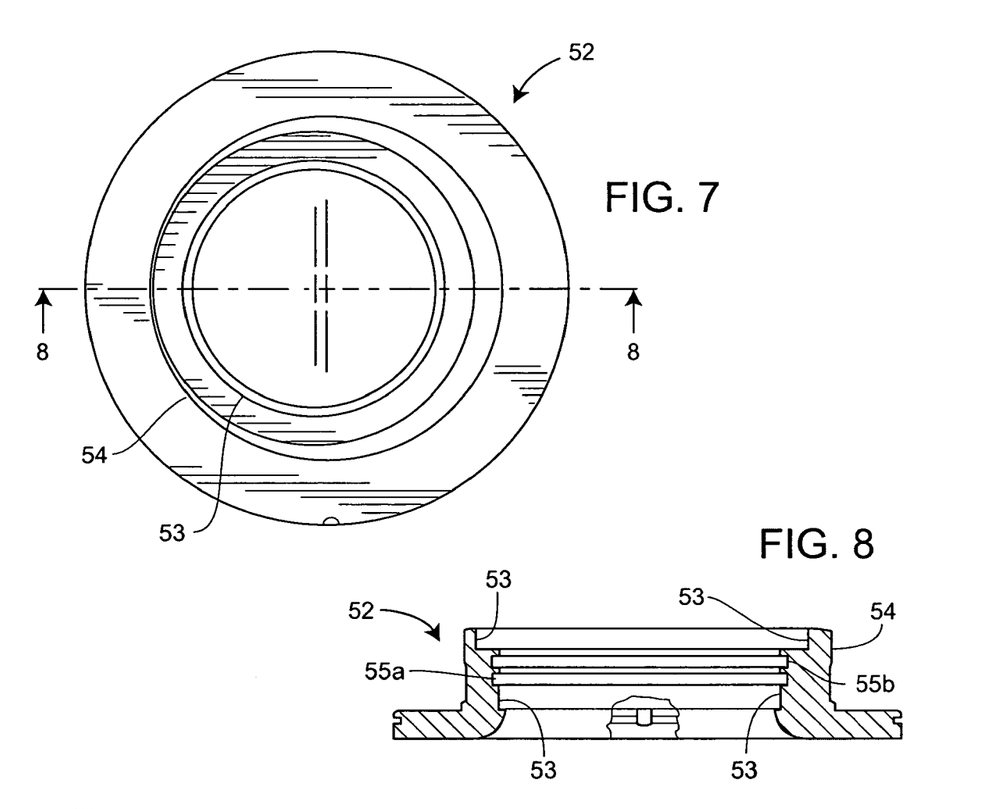
FIG. 7 is a top view of the seal housing.
FIG. 8 is a cross-sectional view of the seal housing of FIG. 5A, taken along line 8-8 of FIG. 7.

In another example, as shown in FIGS. 7 and 8, the seal housing 52, has an offset interior surface 53. As discussed earlier, the main seal 64 is moveably connected to the seal housing 52. Preferably, the main seal 64 moves slidingly within the seal housing 52, allowing the main seal to contact the ball element 80. The above mentioned offset, created by the non-concentricity of the interior surface 53 of the seal housing 52, and the exterior surface 54 of the seal housing 52, aids in the sealing and closing of the valve 20, whereby the interior surface 53 is placed, such that when the ball element 80 abuts the main seal 64, the ball element 80 and the interior surface 53 are aligned. As mentioned earlier, however, the use of a combination of eccentric motions, may align the ball element 80 to the main seal 64, without necessitating the offset or non-concentric location of the interior surface to the exterior surface 54.

In operation, the ball valve 20 can be utilized in many situations with varying media, but will be herein described as regulating high pressure fluids containing particles, including, but not limited to, wood fiber and water slurries used in the pulp and paper industries. Prior to use of the valve 20 or during the use of the valve 20, such as during inspections or routine maintenance, the gap 71 may be measured and set by the assembly personnel or by maintenance personnel. The gap 71 may be set to ensure proper tolerances of the different valve components, thereby ensuring a proper fit between the valve components, but the gap 71 may also be measured and set after the valve 20 has been in operation, thereby ensuring proper continued operation of the valve 20.

When the valve 20 is in the open position, there are a limited number of restrictions for the fluid as it passes through the primary flowpath 33. A ridge 58, located on the seal housing 52, limits the opposition to the fluid by the main seal 64. More specifically, as the fluid flows through the valve 20, especially when the fluid flows from the inlet 31 to the outlet 32, the ridge 58 gives shelter to the secondary flowpath 72 and the main seal 64, by diverting the flow of fluid from the secondary flowpath 72 into the primary flowpath 33. As the fluid flows through the valve 20, for example, the fluid without the existence of the ridge 58, may be directly forced in to the secondary flowpath 72, whereas with the ridge 58, the fluid is disposed to forgo entering the secondary flowpath 72 and continue on through the valve 20. One of the many benefits derived from the ridge 58 is the reduction of "packing of solids" within the secondary flowpath 72. The packing of solids, as the name suggests, occurs as fibrous materials, such as pulp stock and/or particles accumulate within the secondary flowpath 72, thereby creating a number of problems, including, but not limited to, reducing the range of motion of the main seal 64 and creating friction and unwanted forces within the seal assembly 50. The packing of solids, however, is not limited to the secondary flowpath 72 located near the gap 71 of the valve 20, but may also occur in the secondary flowpath 72 located near the gap 73. Preventing the accumulation of the fibrous materials or particles in the gap 73 and secondary flowpath 72 near the gap 73, is the substantial elimination of the gap 73. More specifically, while the valve 20 is in the open position, the resilient member 70 will force the main seal 64 toward a ledge 81, thereby substantially eliminating the gap 73 and preventing the fluid from entering the gap 73 and the secondary flowpath 72.

As the valve 20 closes, however, the ball element 80 slowly begins to restrict the flow through the primary flowpath 33, by rotating about the shaft 90 and progressively placing the spherical surface 82 of the ball element 80 into the primary flowpath 33. The V-notch 83 in the ball element 80 permits the fluid traveling through the primary flowpath 33 to be properly regulated by creating a flow restriction that slowly tapers closed, until the flowpath 33 is fully restricted.

As the ball element 80 rotates into the closed position, however, the spherical surface 82 only contacts the seal assembly 50 at the contact point 66, toward the end of the closing process. The ball element 80 rotates into the closed position a distance away from the seal assembly 50. The spherical surface 82, may only contact the seal assembly 50 a calculated distance before the ball element 80 fully restricts the primary flowpath 33. From the time of contact, between the ball element 80 and the main seal 64, until the valve 20 is in the closed position, the ball element 80 and hence the spherical surface 82 will remain in contact with the main seal 64.

The rotation of the ball element 80, without contacting the seal assembly 50, is accomplished, in the above example, by eccentrically mounting the ball element 80 to the shafts 90 and 91. Specifically, the natural pivot point of the ball element 80, through apertures 84a & 84b, is offset relative to the shafts 90 and 91, respectively, such that the shafts 90 and 91 are mounted onto the ball element near the natural pivot point of the ball element 80, but away from the seal assembly 50 and away from the side to which the ball element 80 pivots. In addition, the shafts 90 and 91 may also be eccentrically mounted relative to the housing 30, whereby the undesired offset of the ball element 80 created by the first eccentric action, is offset by the second eccentric action.

In doing so, it will be appreciated that the ball element 80, may be able to rotate relative to the main seal 64, while at the same time moving into a direction normal to the seal 64. As a result, when moving into a closed position, any particles or fibers within the media being processed, are sheared between the ball element 80 and the main seal 64, thereby ensuring a proper seal. More specifically, as the ball element 80 contacts the main seal 64, particles and/or fibers may become lodged between the main seal 64 and the ball element 80. As the ball element 80 continues to close, any particles and/or fibers may be sheared by the continued contact between the ball element 80 and the main seal 64, such that the knifelike edge, of the V-notch 83, may further aid the shearing.

To ensure proper closure between the seal assembly 50 and the ball element 80, the main seal 64 is slidably attached to the seal housing 52, and located relative to the ball element 80, such that when the ball element 80 contacts the main seal 64, the main seal 64 is displaced into the seal housing 52 by compressing the resilient member 70.

During the opening and closing of the valve 20, the displaceable main seal 64, the housing 30, and the gap 73, in conjunction with the eccentrically mounted ball element 80, may combine to control the proper angle of engagement between the ball element 80 and the main seal 64. The angle of engagement as disclosed herein, are the degrees of rotation of the ball element 80, during which the spherical surface 82 of the ball element 80 is in contact with the main seal 64. For example, as the ball element 80 rotates toward the closed position, the spherical surface 82 will eventually contact the main seal 64. The degrees of rotation the ball element 80 undergoes, from the time the spherical surface 82 contacts the main seal 64, until the ball element 80 comes to a stop, thereby closing the valve 20, is the angle of engagement. Similarly, as the ball element 80 rotates from the closed position to the open position, the spherical surface 82 will eventually break contact with the main seal 64. The degrees of rotation the ball element undergoes, from the time the ball element 80 begins rotating, until the spherical surface 82 breaks contacts the main seal 64 is again, the angle of engagement.

The main seal 64, the housing 30, the gap 73, and the ball element 80, may combine to control the proper angle of engagement, by providing a properly sized gap 71 between the seal housing 52 and the main seal 64. The gap 71 located outside the valve 20, when measured and set, may indicate the size of the gap 73, located in the valve 20. The size of the gap 73 may determine the amount of angle of engagement, whereby a larger gap may produce a greater angle of engagement and a smaller gap may produce a lesser angle of engagement. For example, when the ball element 80 is in the closed position, the main seal 64 may be displaced into the seal housing 52, such that the resilient member 70 is compressed and the main seal 64 is biased against the ball element 80. In this closed position, the gap 73 may be in size equal to the amount of distance the ball element displaces the main seal 64. As the valve 20 opens and the ball element 80 begins to rotate, the eccentric movement to which the ball element 80 may be subjected, may cause the ball element 80 to move away from the seal assembly 64. During this movement, the main seal 64 may remain in contact with the ball element 80, due to the resilient member 70 biasing the main seal 64 toward the ball element 80. More specifically, as the ball element 80 recedes from the seal assembly 64, the resilient member 70 may decompress, thereby enabling the main seal 64 to remain in contact with the ball element 80.

The main seal 64 may remain in contact with the ball element 80 until the main seal 64 is prevented from further movement toward the ball element 80. One way the main seal 64 may be prevented from further moving toward the ball element 80 is to provide a stop for the main seal 64, such that the ball element 80 is allowed to further retreat from the seal assembly while the main seal 64 is restrained. The housing 30, completing one side of the gap 73, may provide for the stop. More specifically, as depicted in FIG. 4, the housing 30 includes a stop in the form of the ledge 81 such that the main seal 64 contacts and bottoms out against the ledge 81, thereby preventing the resilient member 70 from further decompressing and preventing the main seal 64 from further movement and contact with the ball element 80. Therefore, by providing the ledge 81 and more specifically, by providing a main seal 64 that is adjustable relative to the ledge 81, the relative engagement and disengagement, and hence the angle of engagement, of the main seal 64 to the ball element 80 may be controlled and adjusted.

With the addition of the resilient member 70, a secondary flowpath 72 is created between the main seal 64 and seal housing 52. Disposed in the secondary flowpath 72, between the main seal 64 and the seal housing 52, are the seal rings 60a & 60b. The seal rings 60a & 60b are elastic and are able to expand and contract both in the radial and axial directions.

The seal rings 60a & 60b also aid in the alignment of the ball element 80 to the main seal 64. This is accomplished during the closing of the valve 20, when the ball element 80 contacts the main seal 64 at the contact point 66. The ball element 80, at that time, places forces on the main seal 64 and attempts to displace the main seal 64 relative to the inner surface 53 of the seal housing 52. The seal rings 60a & 60b allow the main seal to be displaced axially and radially, all the while keeping the ball element 80 and main seal 64 aligned thereby creating a flow restriction of the primary flowpath 33.

To properly utilize the full potential of the eccentric action of the ball element 80, however, it must be realized, as mentioned previously, that due to the properties of the eccentricity, the main seal 64 may not be aligned to the ball element 80 in the closed position of the valve 20, as it would be if the ball element 80 were rotated about the ball element's natural pivot point. Therefore, to allow the ball element 80 to be eccentrically rotated into the closed position, the inner surface 53 of the seal housing 52 is offset relative to the exterior surface 54 of the seal housing 52, making the inner surface 53 and outer surface 54 of the seal housing 52 non-concentric.

To ensure the proper alignment of the ball element 80 to the inner surface 53, an alignment device 57, such as a pin as shown in FIG. 3 may be used. The alignment pin 57, may be fixedly attached to the housing 30, and more specifically may be pressed into a counterbore that is located around the perimeter of the inlet 31, so that the seal housing 52 may be rotated to engage a counterbore located in the seal housing 52 with the alignment pin 57. Conversely, if the valve 20 contained a dual eccentric mechanism, whereby two independent eccentric mechanisms combine to create one motion, the inner surface 53 may not need to be non-concentric to the outer surface of the seal housing 52.

When the ball valve 20 is in the closed position, high pressure forces are created at the inlet 31. The increase of pressure may force the process fluid to bypass the primary flowpath restriction and be forced through the secondary flowpath 72. Preventing the fluid from penetrating through the secondary flowpath 72 is the seal ring 60a, positioned such that the seal ring legs 61a & 61b are facing toward the incoming fluid. Similarly, the increase of pressure may begin to deform or flex shafts 90 and 91 toward the direction of flow. As shafts 90 and 91 flex, the ball element 80 may begin to be displaced in a normal direction relative to the seal assembly 50. Preventing a leak between the displaced ball element 80 and the main seal 64, is the resilient member 70, by biasing the main 64 seal toward the ball element 80 as the ball element 80 is displaced. As the pressure increases, the shaft 90 and 91 may further flex, thereby further increasing the displacement of the ball element 80. The main seal 64 will continue to be biased against the ball element 80, until the main seal 64 is stopped, or the resilient member 70 is fully decompressed. The resilient member 70 during high pressure situations, however, may not be fully decompressed before disengagement with the main seal 64. The resilient member 70, may not fully decompress due to pressure forces against the main seal 64 created by the fluid. The gap 73 may, therefore, be large enough to ensure that the main seal 64 is not stopped by the ledge 81, at the lower portion of the gap 73, thereby ensuring continued contact between the main seal 64 and the ball element 80, even during high pressure scenarios.

As noted earlier, however, the high pressure may be created at the outlet 32, depending on the direction of the fluid flow through the primary flowpath 33. If the primary flowpath 33 would be reversed, the fluid would penetrate from the other side of the secondary flowpath 72, around the resilient member 70, and be restricted from further penetration by seal ring 60b, also positioned such that the seal ring legs 61a & 61b are facing toward the incoming fluid. Similarly, the high pressure fluid may deform or flex the shafts 90 and 91, thereby displacing the ball element 80 toward the seal assembly and main seal 64. Preventing the leak of fluid between the ball element 80 and the main seal 64, once again, may be the resilient member 70 by biasing the ball element 80 against the main seal 64. As the pressure increases, thereby further flexing the ball element 80 toward the seal assembly 50, the main seal 64 may eventually bottom out on the seal housing 52, thereby substantially eliminating the gap 71.

The foregoing detailed description has been given for clearness of understanding only and no unnecessary limitations should be understood therefrom, as modifications will be obvious to those skilled in the art.

What is claimed is:

1. A valve comprising:
a valve housing having an inlet and an outlet and a fluid flowpath connecting the inlet and the outlet;
a ball element pivotably mounted in the valve housing;
a main seal disposed within the fluid flowpath and biased toward the ball element;
a seal housing disposed between the main seal and the valve housing, the main seal being movable relative to the seal housing; and
a bellows disposed between the main seal and the seal housing, the bellows preventing fluid flow between the main seal and the seal housing,
the seal housing including a pair of stops positioned to span a ledge carried by the main seal and arranged to limit movement of the main seal toward and away from the ball element.

2. The valve of claim 1, wherein the bellows seals the valve against flow entering from at least one of the inlet and the outlet when the ball element is in a closed position.

3. The valve of claim 1, wherein the bellows aligns the ball element and the main seal assembly.

4. The valve of claim 1, wherein the main seal and the seal housing are connected with a resilient member.

5. The valve of claim 4, wherein the bellows abuts the main seal when receiving pressure through a first gap between the main seal and the seal housing.

6. The valve of claim 4, wherein the bellows abuts the seal housing when receiving pressure through a second gap between the main seal and the seal housing.

7. A valve comprising:
a valve housing having an inlet and an outlet and a fluid flowpath connecting the inlet and the outlet;
a ball element pivotably mounted in the valve housing, an exterior surface of the ball element defining a portion of a sphere, wherein all points on the exterior surface of the ball element are not equidistant from a natural pivot point of the ball element;
a main seal disposed within the fluid flowpath and biased toward the ball element;
a seal housing disposed between the main seal and the valve housing, a gap being formed between the main seal and the seal housing, the gap being exposed to fluid pressure within the valve the seal housing including a pair of stops positioned to span a ledge carried by the main seal and arranged to limit movement of the main seal toward and away from the ball element; and
a secondary seal disposed between the main seal and the seal housing, the secondary seal preventing fluid flow through the gap,
wherein a portion of the gap directly exposed to the fluid pressure is oriented substantially perpendicular to a direction of fluid flow through the valve housing, and wherein the secondary seal is arranged to shift in a direction substantially perpendicular to the direction of fluid flow through the valve housing.

8. The valve of claim 7, wherein the secondary seal includes a bellows.

9. The valve of claim 8, wherein the bellows abuts the main seal when receiving pressure through a first end of the gap.

10. The valve of claim 8, wherein the bellows abuts the seal housing when receiving pressure through a second end of the gap.

11. The valve of claim 8, wherein the bellows is constructed from an anti-corrosive metal alloy.

12. The valve of claim 7, wherein the ball element seals the valve against flow entering from at least one of the inlet and the outlet when the ball element is in a closed position.

13. The valve of claim 7, wherein the seal housing includes a ridge that limits movement of the main seal in a direction away from the ball element.

14. The valve of claim 7, wherein the secondary seal aligns the main seal and the ball element.

15. The valve of claim 7, wherein the seal housing includes a ridge thereby diverting a fluid flow over the main seal.

16. A valve comprising:
a valve housing having an inlet and an outlet and a fluid flowpath connecting the inlet and the outlet;
a ball element pivotably mounted in the valve housing, an exterior surface of the ball element defining a portion of a sphere, wherein all points on the exterior surface of the ball element are not equidistant from a natural pivot point of the ball element;
a main seal disposed within the fluid flowpath and biased toward the ball element;
a seal housing disposed between the main seal and the valve housing, a gap being formed between the main seal and the seal housing, the gap being exposed to fluid pressure within the valve; and
a secondary seal disposed between the main seal and the seal housing, the secondary seal preventing fluid flow through the gap,
wherein a portion of the gap directly exposed to the fluid pressure is oriented substantially perpendicular to a direction of fluid flow through the valve housing;
wherein the main seal is biased toward the ball element by a resilient member; and
wherein the main seal is restricted in movement in direction towards and away from the ball element by the seal housing.

17. A method of operating a valve, comprising:
providing a valve body having an inlet, an outlet and a seal assembly, wherein the seal assembly comprises a main seal, a seal housing, and a bellows;
positioning the bellows between the main seal and the seal housing;
biasing the main seal toward a ball element;
providing the seal housing and the main seal with stops positioned to span a ledge carried by the main seal to thereby limit movement of the main seal toward and away from the ball element
controlling a first flow through the valve by rotating the ball element eccentrically mounted to the valve body into and out of engagement with the main seal; and
impeding a second fluid flow through the seal assembly by attaching a resilient seal to the main seal and the seal housing,
wherein the main seal is moved away from the ball element exclusively through direct contact with the ball element when the ball element moves into a closed position.

18. The method of claim 17, wherein attaching the resilient seal to the main seal and the seal housing includes attaching a first end of a bellows to the seal housing and a second end of the bellows to the main seal.

19. The method of claim 17, further including restricting the movement of the main seal with the seal housing.

* * * * *

UNITED STATES PATENT AND TRADEMARK OFFICE
CERTIFICATE OF CORRECTION

| | | |
|---|---|---|
| PATENT NO. | : 7,484,710 B2 | Page 1 of 1 |
| APPLICATION NO. | : 11/068946 | |
| DATED | : February 3, 2009 | |
| INVENTOR(S) | : Koester et al. | |

It is certified that error appears in the above-identified patent and that said Letters Patent is hereby corrected as shown below:

In the Specification:

At column 2, line 29, "ring" should be -- ring; --.

At column 4, line 4, "At a" should be -- At an --.

At column 4, line 25, "element." should be -- element --.

At column 5, line 62, "Inc.)" should be -- Inc., --.

At column 5, line 67, "he" should be -- the --.

In the Claims:

At column 11, line 15, in claim 1, "housing" should be -- housing, and --.

At column 11, line 24, in claim 3, "seal assembly" should be -- seal --.

At column 12, line 48, in claim 17, "element" should be -- element; --.

Signed and Sealed this
Second Day of June, 2015

Michelle K. Lee
*Director of the United States Patent and Trademark Office*